Sept. 21, 1948.　　　D. L. LOTTS ET AL　　　2,449,905
POWER UNIT
Filed Nov. 2, 1942　　　　　　　　　　　　6 Sheets-Sheet 1

INVENTORS
DELBERT L. LOTTS
HAROLD E. WALDRON
ROY T. BUCY
BY
ATTORNEYS

Sept. 21, 1948. D. L. LOTTS ET AL 2,449,905
POWER UNIT
Filed Nov. 2, 1942 6 Sheets-Sheet 2
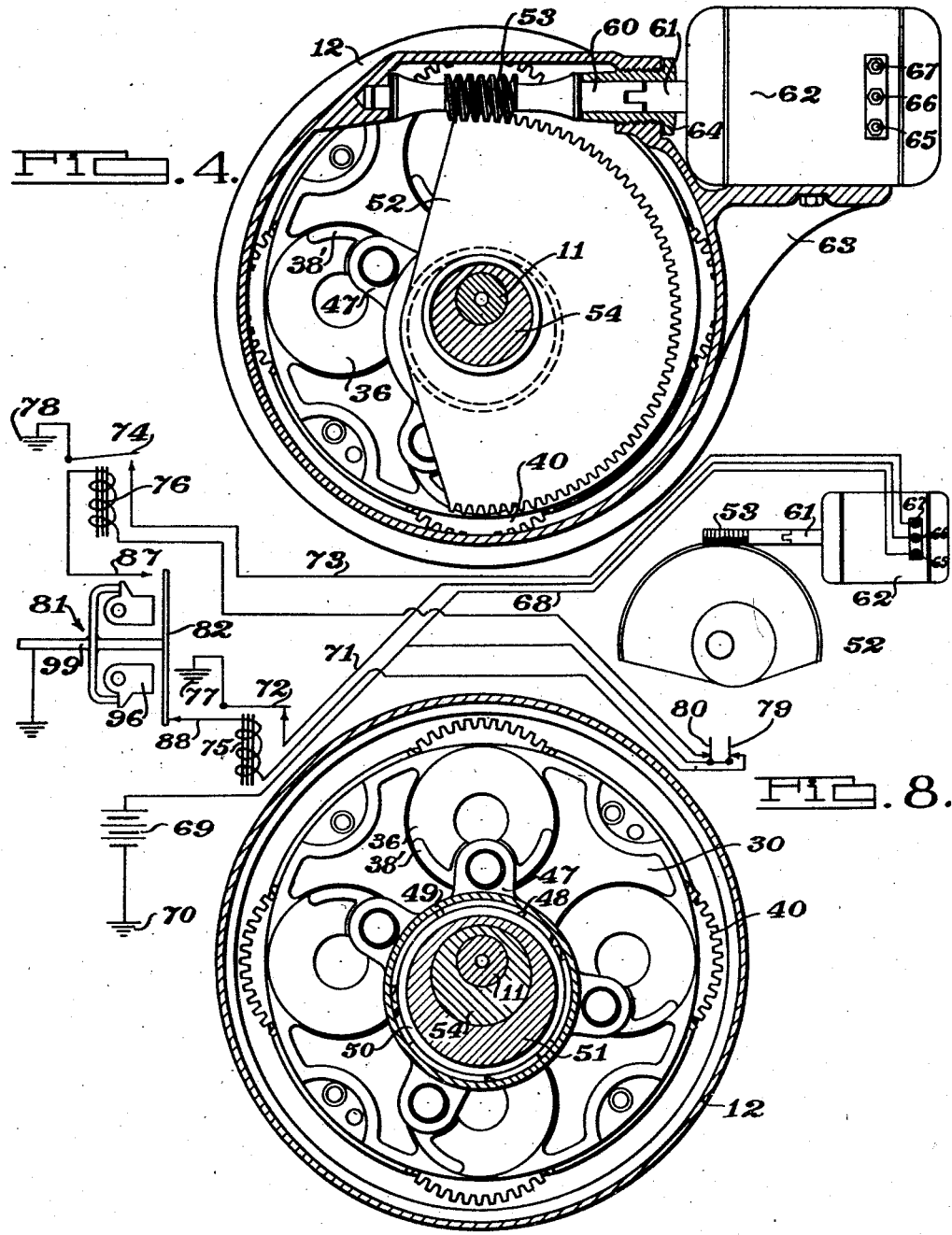
INVENTORS
DELBERT L. LOTTS
HAROLD E. WALDRON
ROY T. BUCY
BY
ATTORNEYS

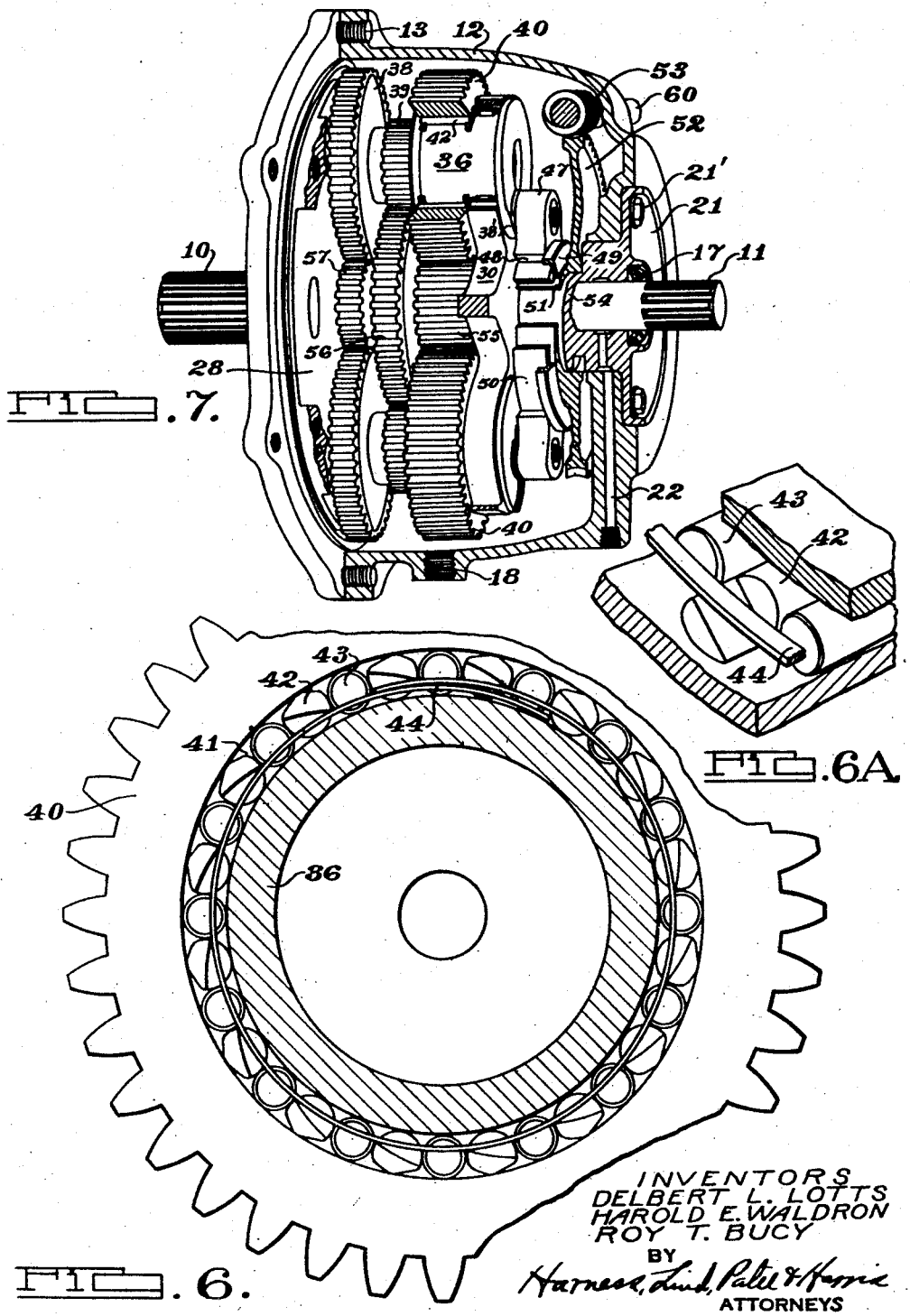

Sept. 21, 1948.   D. L. LOTTS ET AL   2,449,905
POWER UNIT
Filed Nov. 2, 1942   6 Sheets-Sheet 4

INVENTORS
DELBERT L. LOTTS
HAROLD E. WALDRON
ROY T. BUCY
BY
*Harness, Dickel, Pater & Harris*
ATTORNEYS

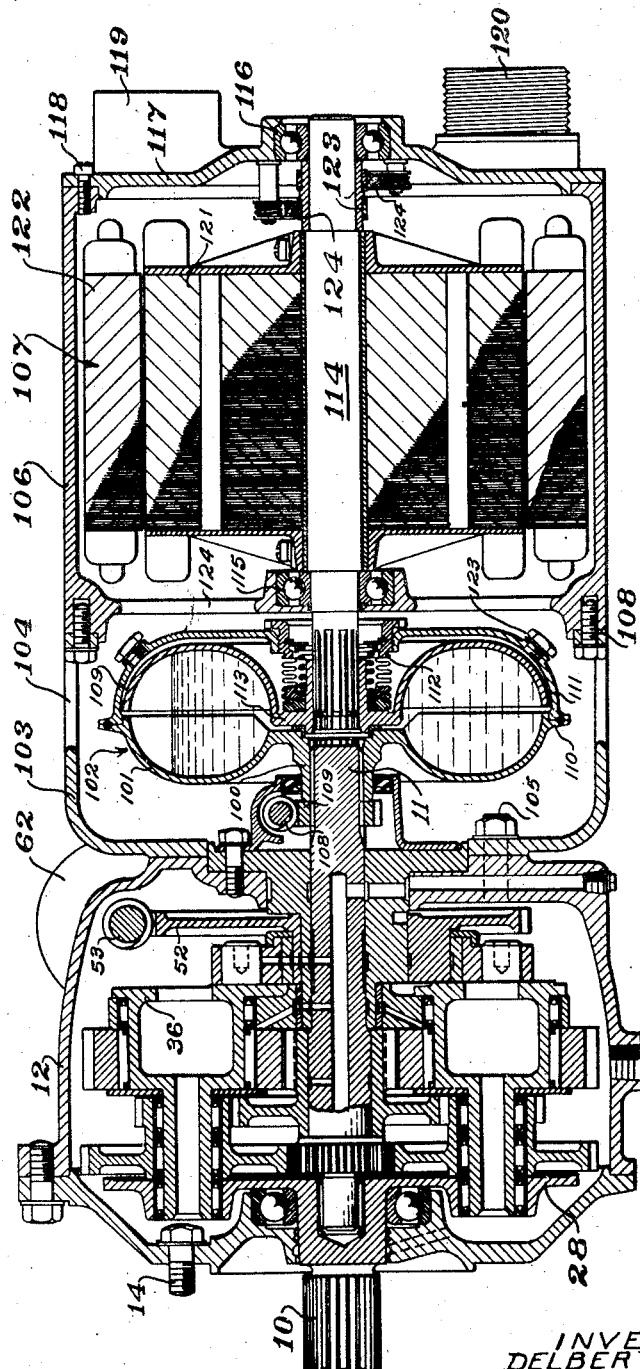

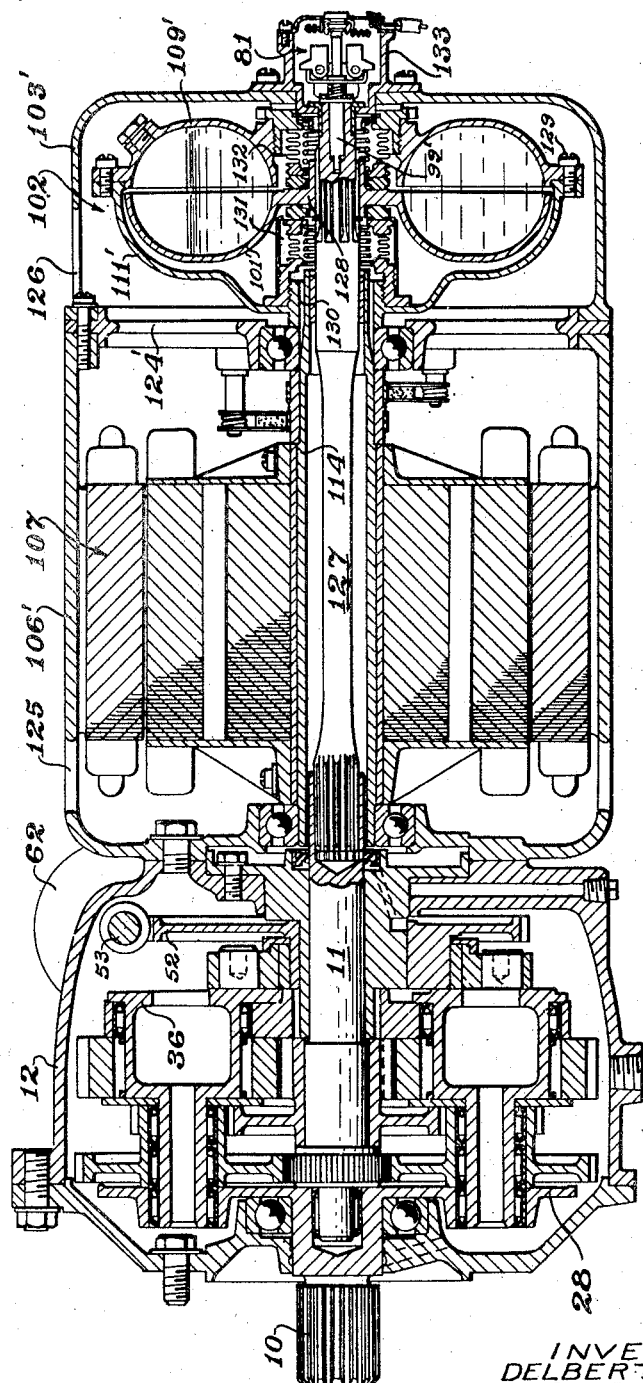

Patented Sept. 21, 1948

2,449,905

UNITED STATES PATENT OFFICE 2,449,905

POWER UNIT

Delbert L. Lotts, Kent, Ohio, and Roy T. Bucy and Harold E. Waldron, Detroit, Mich., assignors to Chrysler Corporation, Highland Park, Mich., a corporation of Delaware Application November 2, 1942, Serial No. 464,182

1 Claim. (Cl. 74—114)

This invention relates to improvements in constant speed transmission mechanisms of the intermittent uni-directional variable throw crank type.

More specifically it relates to an improved transmission of this type which is simpler, more compact, more economical to build and more durable than those heretofore known.

The primary object of the invention resides in the provision of a transmission of this type having the foregoing characteristics which is particularly suitable for driving an electric generator.

For some years the advantages of the use of A. C. power on airplanes, vehicles, small boats, etc., has been appreciated. The fact that variable speed internal combustion engines usually constitute the driving power source for these vehicles has heretofore prevented the use of A. C. generative equipment because the frequency of an A. C. supply system must be maintained within approximately 5% of normal or undue heating of transformers, relays, etc., results. Furthermore in the case of aircraft, it is necessary to have full electric power available for the operation of auxiliaries such as landing gear, gun turrets, bomb release mechanism, etc. even when the craft is proceeding at slow speed with the motors throttled down.

Our improved transmission is extremely well adapted for driving an A. C. generator and we have illustrated several embodiments of a complete A. C. power unit adapted for use with an aircraft or similar engine. It is, however, desired to emphasize the fact that the transmission is useful for and adaptable to many other uses.

In the drawings accompanying this description,

Fig. 4 is an enlarged section taken along the line 4—4 of Fig. 1.

Fig. 5 is an enlarged section taken along the line 5—5 of Fig. 1.

Fig. 6 is an enlarged section taken along the line 6—6 of Fig. 1.

Fig. 6—A is a perspective detail view of the Fig. 6 mechanism.

Figures 1, 3:
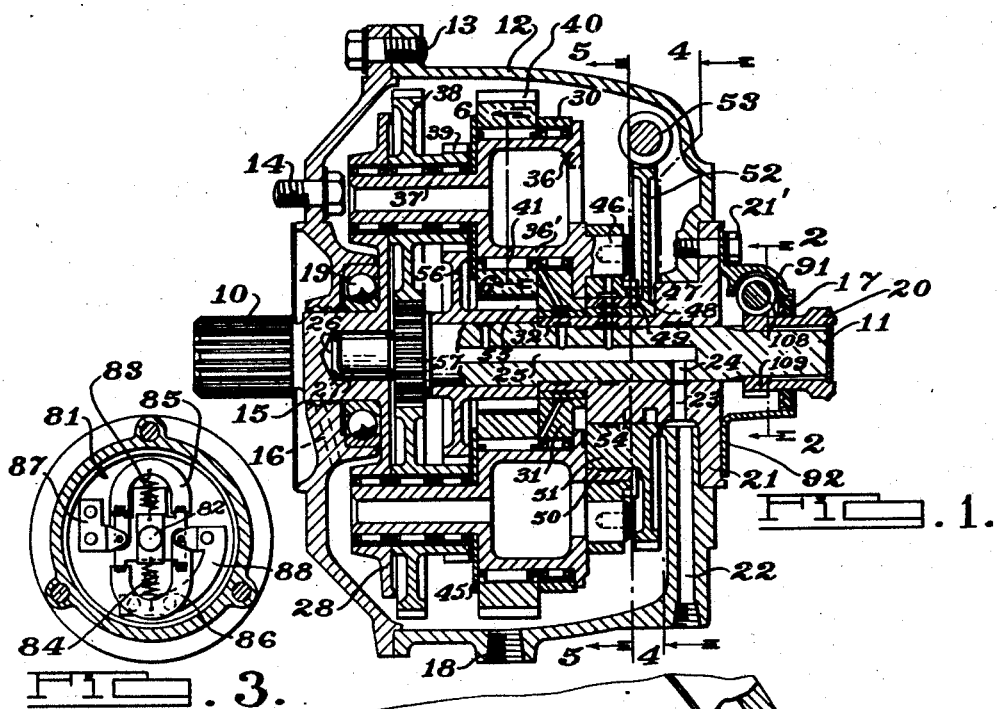
Fig. 1 is an elevational sectional view of the transmission.
Fig. 3 is a section taken along the line 3—3 of Fig. 2.

Fig. 7 is a perspective view of the transmission mechanism drawn to the same scale as Fig. 1, certain parts being broken away to illustrate details.

Fig. 8 is a schematic wiring diagram of the transmission control system.

Figure 9:
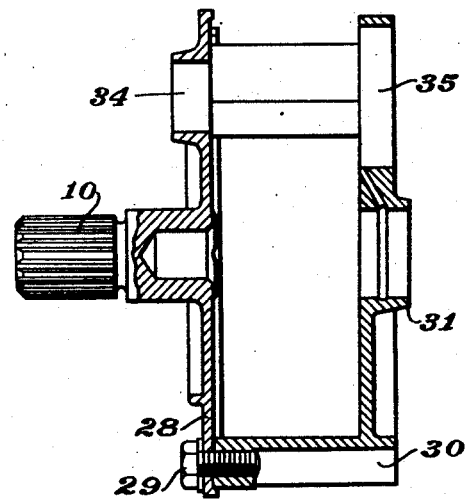
Figure 11:
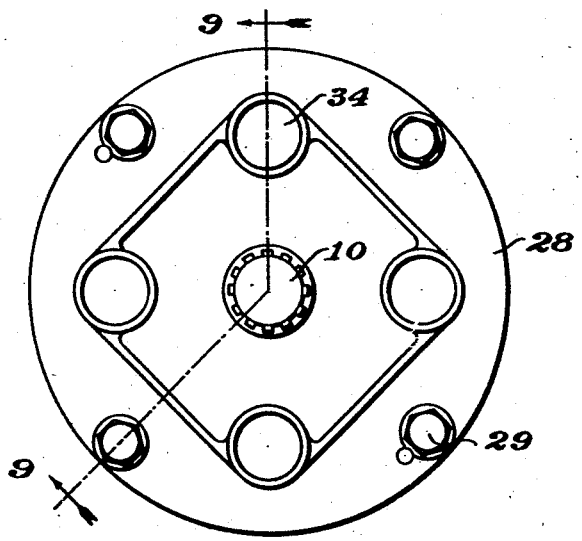

Fig. 9 is a sectional view taken along the line 9—9 of Fig. 11 of the gear carrier.

Figure 10:
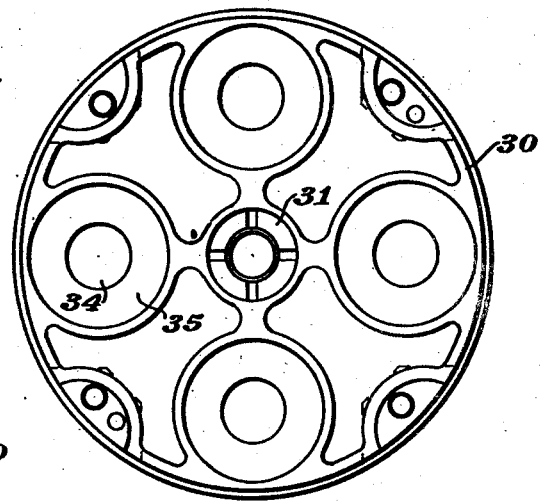

Fig. 10 is a rear elevation of the gear carrier.

Fig. 11 is a front elevation of the gear carrier.

Fig. 12 is an elevational sectional view of an electrical power unit wherein a fluid coupling is used in conjunction with the transmission for driving a generator, and Fig. 13 is an elevational section view of a modified electrical power plant arrangement.

Referring to Figs. 1 to 8 for the present, 10 designates the input shaft and 11 the output shaft. The two shafts are coaxially mounted in a two-part generally cylindrical casing 12. Bolts 13 are provided for securing the two parts of the casing together and the front face of the casing carries the bolts or studs 14 for mounting the casing on a support, as for example, an internal combustion engine block. The shaft 10 is adapted to engage the accessory drive member (not shown) of the engine, and the shaft 11 is adapted to engage the driving member 20 of an engine driven auxiliary such as a generator, supercharger, or the like.

An anti-friction bearing 19 journals the shaft 10 in the casing and the shaft 11 is rotatably carried at its rear end by an elongated bushing 21 having an outer enlarged flange secured to the casing by cap screws 21'. The front end of shaft 11 is piloted in the hollow portion 26 of shaft 10, a needle bearing 27 journalling the two as shown. Lubricant is supplied to the transmission through the passage 22 which is preferably connected to the main engine oil supply. The passage 22 connects with the oil distribution passages 23, 24, 25 from which the oil flows through the mechanism. Overflow from the front bearing 19 is collected and returned to the sump through chamber 15 and passage 16 and a drain passage 18 is provided at the lowest part of the casing.

The shaft 10 is formed at its rear portion with an enlarged plate 28 to which is secured by cap screws 29 a cage 30. The cage has a hub 31 which receives and journals the inner portion 32 of the elongated bushing 21. The cage structure which includes the members 28 and 30 is provided with four axially spaced bearing receiving holes 34 and 35 (see Figs. 9, 10 and 11) in each of which is journaled by means of antifriction bearings a crank element 36.

Each crank element consists of an enlarged annular portion 36' and an axial reduced annular portion 37. The reduced portion 37 carries a pair of integrally formed gears 38, 39 of different pitch diameters, and the portion 36' carries a gear 40. The gears 38, 39 are freely rotatable as a unit on the member 36 and the gear 40 is mounted thereon by means of an overrunning one-way clutch generally designated by the numeral 41.

The clutch 41 is shown in detail in Figs. 6 and 6—A and comprises a set of cams 42 spaced by rollers 43. The cams extend axially beyond the rollers at each end thereof and are provided at each end with a cut-out portion for receiving a spring member 44. The latter is shaped as illustrated and serves to retain the cams and rollers in assembled relation as well as urge the cams in a counterclockwise direction as seen in Fig. 6 wherein they tend to wedge between the hub 36 and the gear 40 and thereby provide a driving connection therebetween when the crank element 36 rotates clockwise. Counterclockwise rotation of the member 36 will cause a slight clockwise rotation of the cams which releases them from wedging between the hub and gear and permits an overrunning motion between these two members.

In practice four sets of crank elements, overrunning clutches and gears 40 are provided, but it has been found necessary to provide only two sets of the gears 38, 39 which are disposed 180° apart on the cage structure. When only two sets of gears 38, 39 are used, spacers are provided on the reduced portions 37 of the driving members between the bearing for the forward end of the member 36 and the washer 45 which retains the bearings in place.

Each crank element 36 has an integral crank pin 46 on which is rotatably carried a shoe 47. The shoe has a lip 48 which externally engages a cup-shaped washer 49. The latter prevents the shoes from flying outwardly under the influence of centrifugal force and acts as a spacer. An arcuate projection 36' formed on the crank element spaces the shoe axially for free swinging relatively thereto. The shoes 47 are provided with internal accurately formed arcuate surfaces which engage a ring 50 carried by an eccentric 51. The eccentric carries an integral worm wheel segment 52 which meshes with a worm 53. Rotation of the worm causes corresponding rotation of the eccentric 51 on the eccentrically shaped hub 54 of the bushing 21.

From the description so far it may be seen that rotation of the shaft 10 and the cage 30 will drag the shoes 47 around the eccentric 51 and if the latter is positioned in neutral or concentric position with its center coincident with that of the shaft 11, there will be no oscillation of the crank elements 36 or of the gears 40 although the latter will be clutched to the driving members 36 by the one-way clutches 41.

The gears 40 mesh with a gear 55 formed integrally with a larger gear 56, the latter being in mesh with the gears 39. The gears 55—56 are journaled on the shaft 11 for free rotation with respect thereto. The inner end of the output shaft 11 is formed with a gear 57 which meshes with the gears 38, thus it will be seen that when the eccentric 51 is in neutral the entire cage assembly including the gears 38, 39 and 40 revolves with the gears themselves stationary. The gear 57 is therefore turned at the speed of the cage and a one to one ratio exists between the shafts 10 and 11.

Adjustment of the eccentric 51 to a position that is eccentric with respect to the shaft 11 will cause the crank elements 36 to be oscillated in succession as the respective shoes 47 pass over the high portion of the eccentric. This oscillation is intermittent and the amplitude depends upon the amount of eccentricity of the member 51. Because of the one-way clutch 41 each oscillation of a crank element 36 will impart a rotative impulse to the corresponding gear 40 which rotation will be transmitted through gears 55, 56, 39, 38 and 57 to shaft 11.

In cases where a constant speed input is available and a variable speed output desired, the overdrive speed of the shaft 11 can, of course, be controlled by adjustment of the eccentric 51. When the eccentric is in neutral position, the speeds of the shafts 10 and 11 are identical. As the eccentric is rotated toward maximum driving position the speed of the shaft 11 will be equal to that of the shaft 10 plus the velocity imparted through the speed multiplying gearing by the oscillation of the crank elements 36. The amount of overspeed depends upon the length of stroke of the shoes 47 which in turn depends upon the amount of eccentricity of the member 51.

In the present instance where it is desired to maintain the output shaft 11 at constant speed within narrow limits, control mechanism is provided for adjusting the eccentric in accordance with increase or decrease of the speed of the output shaft above or below a predetermined value.

This control mechanism is illustrated in Figs. 2 to 5 and 8. The worm 53 which drives the eccentric adjusting worm wheel 52 is journaled in the casing 12 as shown in Fig. 4. One end of the worm shank 60 is provided with a slot which receives a key formed on the end of a shaft 61 of a reversible electric motor 62. The motor is mounted on a casing bracket 63 and a threaded fitting 64 is provided for convenience of assembly of the worm and motor shaft.

The motor 62 is energized through three terminals designated 65, 66 and 67. The terminal 65 is connected through a wire 68 to a battery 69 which is grounded at 70 to the casing 12 or to the metal frame of the aircraft or other vehicle on which the transmission is mounted. Terminal 66 is connected by a wire 71 to a relay operated switch 72 and terminal 67 is likewise connected by wire 73 to a relay operated switch 74. For convenience switches 72 and 74 will be referred to as the "underspeed" and "overspeed" switches respectively and the relays 75 and 76 for operating these switches will be called the underspeed relay and the overspeed relay. The underspeed switch 72 connects the motor terminal 66 to ground at 77 and the overspeed switch 74 connects the motor terminal 67 to ground at 78.

The switch operating relays 75 and 76 are connected to the battery 69 through the limit switches indicated diagrammatically at 79, 80, which switches are normally closed but are adapted to be opened by the eccentric 52 in response to its rotation to the limit of its movement in either direction. The relays are connected to ground through a centrifugally operated switch generally designated by numeral 81. This switch is diagrammatically illustrated in Fig. 8 and more clearly shown in Figs. 2 and 3 and comprises a member 82 adapted for slight to-and-fro movement connected by means of tension springs 83, 84 with a pair of switch arms 85, 86 of spring material. The latter are adapted to be held in neutral position by the member 82; the arm 86 is adapted to engage a switch member 88 connected to the underspeed relay in response to movement of the member 82 toward the right of Fig. 2, and the arm 85 is adapted to engage a switch member 87 connected to the overspeed relay in response to movement of the member 82 toward the left of Fig. 2. The switch 81 may be obtained commercially in a variety of forms and will be described only sufficiently to make the operation apparent as the details thereof form no part of the present invention.

Figure 2:
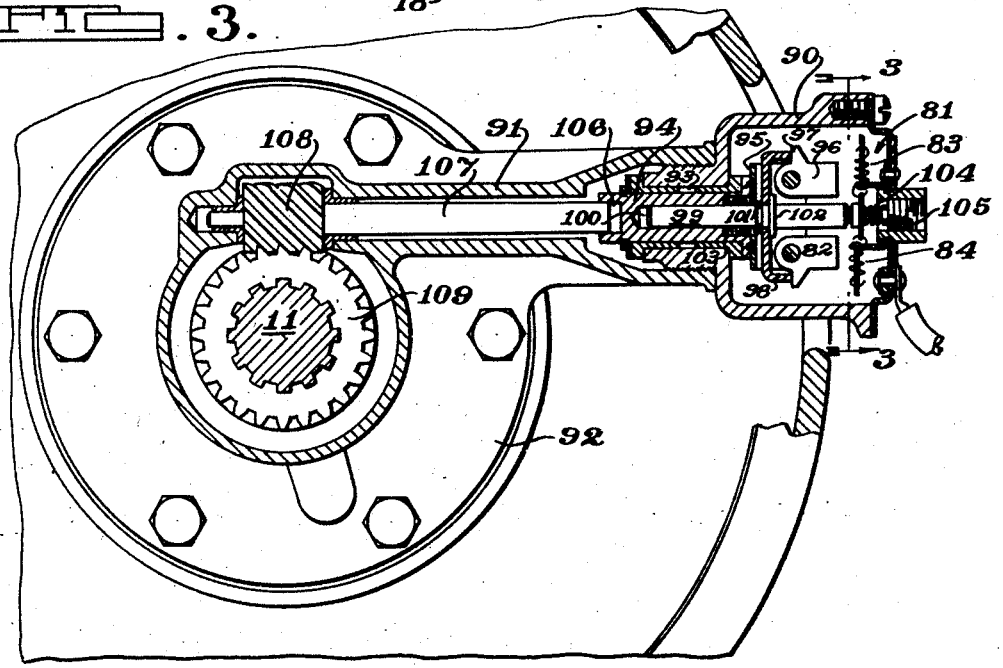
Fig. 2 is an enlarged section taken along the line 2—2 of Fig. 1.

To-and-fro movement of the switch member 82 is controlled by a speed-responsive operated governor mechanism shown in its entirety in Fig. 2. Both the switch and the governor are enclosed in a housing 90 which is threaded into an elongated boss 91 forming part of the end cover 92 of the main transmission housing. The housing 90 has a bore 93 in which is rotatably carried a member 94 having an enlarged outer end 95 on which are pivoted a pair of weights 96. The weights include ears 97 which bear against a member 98. The latter is fixed on a plunger 99 reciprocally carried in the bore 100 of the member 94 by means of a snap ring 101 which holds the member against a shoulder 102 on the plunger as shown. A coil spring 103 acts between the snap ring and a shoulder in the bore 100 to urge the plunger outwardly and the weights 96 inwardly.

The plunger 99 bears against the switch member 82 and a coil spring 104 disposed between the switch member and an adjustable set screw 105 opposes the spring 103. By adjusting the set screw 105 the spring 104 may be tensioned to balance the spring 103 and maintain the switch 81 in neutral.

The member 94 is drivingly connected at 106 with the elongated stem 107 of a worm 108 which is rotatably carried in the boss 91 in driving engagement with a worm wheel 109 splined on the output shaft 11. Rotation of the shaft 11 will cause corresponding rotation of the stem 107 and member 94 and the tendency for the weights 96 to swing outwardly will exert force against the member 98 tending to thrust the plunger 99 toward the left of Fig. 2.

In practice the springs 103 and 104 are selected and adjusted such that the spring 103 will maintain the switch 81 closed to energize the underspeed relay 75 until the desired speed of the shaft 11 has been reached whereupon the force of the weights 96 will thrust the plunger inwardly just sufficiently to permit the spring 104 to open the switch. Should the speed of shaft 11 rise above the desired value, the increased centrifugal force acting on the weights 96 will cause further inward movement of the plunger 99 and permit the spring 104 to close the switch and thereby energize the overspeed relay whereupon motor 62 will be energized to adjust the eccentric 51 as will be more fully explained.

In one installation of our transmission for driving an A. C. generator from an aircraft engine, the device operates as follows:

The low speed cruising R. P. M. of the engine is approximately 1600, the high speed cruising R. P. M. approximately 3,000, and the maximum speed 4,000 R. P. M. The generator speed for normal frequency output is 8,000 R. P. M. and it is desired to maintain the frequency constant within plus or minus 5% throughout this engine speed range. A 5 to 1 maximum step-up in the gearing is provided, part of the speed multiplying gear train preferably being disposed in the engine block (not shown) between the engine crankshaft and the input shaft 10.

When the main driving engine is started the eccentric 52 is in underspeed position, as shown in the drawings, and it remains in this position until the engine reaches 1600 R. P. M. at which speed the switch 81 will open under control of the weights 96. When the eccentric is in its extreme underspeed position the limit switch 79 is open so that the underspeed relay 75 does not remain energized.

As the main engine speed advances the switch 81 closes to energize the overspeed relay 76 and the motor 62 is energized through the switch 74 thus rotating the eccentric 52 to decrease the eccentricity with respect to the axis of the shaft 11 and shorten the stroke of the shoes 47. As the switch 81 is controlled by the output shaft 11 the switch 81 will "hunt" between its closed positions and energize the relays 75 and 76 alternately to thereby maintain the speed of the shaft 11 at the desired 8,000 R. P. M.

When the main engine reaches 4,000 R. P. M. the eccentric 52 is in its extreme overspeed position and the limit switch is open. The eccentricity of the member 52 is then zero and the transmission is running at 1 to 1 ratio, the input shaft 10 being driven at twice engine speed (by means of gearing in the engine block, not shown). During normal high speed cruising at an engine speed of 3,000 R. P. M. the eccentric 52 will occupy an intermediate position and the switch 81 is operative to energize the motor 62 through the relay switches for rotation in either direction to maintain a constant speed at the output shaft 11.

Our transmission may be made a compact and self-contained unit by mounting the control relays 75, 76 on the casing in connection with the motor 62. It is, therefore, a simple matter of installation to insert the casing 12 between the generator driving member of the main driving engine and the generator to provide a constant speed drive.

In cases where extreme smoothness is desired at the output shaft 11, we incorporate a fluid coupling in the drive between the transmission and the generator for damping the oscillations of the shoes 47. Fig. 12 is a sectional elevation of a complete power unit adapted to deliver constant frequency A. C. power when driven from a variable speed source.

In this modification of the invention the output shaft 11 of the constant speed transmission is received by the internally splined hub 100 of an impeller 101 which constitutes the driving element of a fluid coupling 102. The coupling is encased in a housing 103 having air circulating openings 104. The housing 103 is secured to the housing 12 by bolts 105 and is adapted to support the housing 106 of the alternator 107 to which it is secured by bolts 108.

The fluid coupling 102 is of the kinetic type and includes a driven runner 109 disposed in juxtaposition to the impeller 101. The latter has a marginal flange 110 forming a shoulder to which is welded a shroud 111. This shroud encloses the runner and forms the housing of the coupling. A fluid tight seal 112 of the bellows type is disposed between the shroud 111 and the hub 113 of the runner for preventing escape of fluid while permitting free rotation of the runner with respect to the impeller.

The runner hub 113 is internally splined and receives the splined end of the alternator shaft 114. The latter is rotatably supported in the front wall of the casing 106 by a bearing 115 and in the cover 117 by a bearing 116. The cover 117 is removably secured to the casing 106 by cap screws 118 and carries an air duct 119 and a cable duct 120 for accommodating the electrical connections.

The shaft 114 carries the alternator rotor 121, the stator 122 being suitably mounted in the housing 106. Slip rings 123 and brushes 124 are provided for electrically connecting the rotor windings to exteriorly located apparatus. Inasmuch as the details of the alternator are not important with respect to the instant invention only enough of the machine is illustrated to make the description complete for present purposes, it being understood that any desired design of alternator (or D. C. generator) may be utilized with our improved transmission depending upon power demands.

The Fig. 12 power unit is an exceedingly versatile, compact, self-contained power unit which may be assembled in complete form and shipped for assembly with a prime mover, the latter operation requiring only the tightening of the studs 14 and the electrical and lubricant connections. The fluid coupling 102 is filled with fluid to approximately 80% of its capacity through the filler openings 123A at the time of assembly and provides a smooth slip drive between the constant speed gearbox and the alternator.

Cooling air is circulated through the alternator windings and around the coupling, openings 124A being provided in the front wall of the casing 106. The air preferably enters through the duct 119 and discharges through the openings 104 after circulating through the windings and around the coupling. The duct 119 may be connected to a source of air under pressure if desired and/or the alternator may be provided with an air impeller such as is described and claimed in the copending application of Sherman, et al., Serial No. 432,938, filed on March 2, 1942.

Fig. 13 illustrates a modification of the Fig. 12 arrangement which has advantages for some uses. In Fig. 13, the fluid coupling 102 is disposed rearwardly of the alternator 107, this arrangement placing the relatively heavy mass of the alternator closer to the transmission gearbox thus shifting the center of gravity forwardly and in addition permitting the location of the governor mechanism 81 at the outer end of the assembly where it is more accessible for adjustment.

In this modification, the coupling housing 103' and the alternator housing 106' are of slightly different shape as shown and the air circulating openings are indicated at 125 and 126, communication between the two housings being by way of openings 124'.

The impeller 101' of the fluid coupling in Fig. 13 is driven from the output shaft 11 of the constant speed gearbox by means of a shaft 127 which has a splined connection at its forward end with the shaft 11 and a splined connection at its rear end with the impeller hub 128. The runner 109' has a shroud 111' fastened thereto by cap screws 129 and splined at 130 to the alternator shaft 114' which is hollow for the accommodation of shaft 127. With this arrangement two fluid seals are required, one designated 131, between the impeller hub 128 and the shroud 111', and the other designated 132, between the impeller hub and the casing 103'.

The speed-responsive governor switch mechanism 81 is housed in a casing 133 at the extreme rear end of the unit where it is readily accessible for adjustment. The governor drive shaft 99' has a key-and-slot driving connection with the shaft 127 which permits sliding of the shaft 99' to operate the switch as will be understood.

The operation of the constant speed transmission in the Figs. 12 and 13 arrangements is identical with that previously set forth except that there is always some slip between the alternator shaft and the output shaft 11 because of the fluid coupling. This slip may be compensated for by proper adjustment of the speed responsive switch 81 if necessary. The amount of slip is small, on the order of one to two percent at operating speeds and provides a shock absorbing drive which effectively cushions and absorbs the impulses of the crank elements 36 and minimizes the hunting effect of the speed control mechanism.

While we have described only a few of the many possible embodiments of our invention, it is to be understood that these are for illustrative purposes only and are not to be construed as limiting, the scope of our invention being set forth in the claim appended below.

We claim:

In combination, a rotatable driving carrier, a driven shaft coaxial with the carrier, a driven gear fixed to the driven member adjacent the carrier, an overspeed member mounted on the carrier for angular movement about an axis revolving about the axis of the driving member, an intermediate gear mounted on the overspeed member in spaced relation to the carrier, a one-way clutch acting between the overspeed member and the intermediate gear, a first compound gear rotatably mounted on the driven shaft and having two sections, one section meshing with the intermediate gear, a second compound gear rotatably mounted on the overspeed member between the intermediate gear and the carrier and having two sections, one section meshing with the driven gear and the other section meshing with the other section of the first compound gear, means forming a circular track, control means for the overspeed member traveling on the circular track, and means for making the circular track concentric or eccentric with the axis of the driving carrier and the driven shaft, whereby a concentric position of the circular track will prevent relative angular movement between the overspeed member and the driving carrier and thereby produce equal angular velocity of the driving carrier and the driven shaft, and an eccentric position of the circular track will cause rotation of the driving member to produce relative angular movement between the overspeed member and the carrier, said relative angular movement being transmitted through the one-way clutch and the intermediate compound, and driven gears to the driven shaft so as to result in an angular speed of the driven shaft in excess of that of the driving carrier.

DELBERT L. LOTTS.
HAROLD E. WALDRON.
ROY T. BUCY.

(References on following page)

REFERENCES CITED

The following references are of record in the file of this patent:

UNITED STATES PATENTS

| Number | Name | Date |
|---|---|---|
| 637,477 | Newman | Nov. 21, 1899 |
| 818,512 | Arnold | Apr. 24, 1906 |
| 862,425 | DeVeulle | Aug. 6, 1907 |
| 1,047,551 | Myers | Dec. 17, 1912 |
| 1,450,594 | Henriod | Apr. 3, 1923 |
| 1,624,835 | Hatcher | Apr. 12, 1927 |
| 1,732,247 | Tornberg | Oct. 22, 1929 |
| 1,780,293 | Christie et al. | Nov. 4, 1930 |
| 1,816,295 | Pitter | July 28, 1931 |
| 1,949,203 | Havill | Feb. 27, 1934 |
| 2,126,294 | Timmermann | Aug. 9, 1938 |
| 2,206,340 | Vespoli | July 2, 1940 |
| 2,209,417 | Obermoser | July 30, 1940 |
| 2,269,434 | Brooks | Jan. 13, 1942 |
| 2,310,209 | Bousman | Feb. 9, 1943 |

FOREIGN PATENTS

| Number | Country | Date |
|---|---|---|
| 29,282 | France | Mar. 17, 1925 |
| | (Addition to No. 519,496) | |
| 285,970 | Great Britain | Feb. 23, 1928 |
| 489,396 | Great Britain | July 26, 1938 |
| 607,327 | France | Mar. 26, 1926 |
| 672,995 | Germany | Mar. 14, 1939 |